(12) United States Patent
Jastrzebski et al.

(10) Patent No.: US 11,221,235 B2
(45) Date of Patent: Jan. 11, 2022

(54) POSITION SENSOR

(71) Applicant: Lappeenrannan teknillinen yliopisto, Lappeenranta (FI)

(72) Inventors: Rafal Jastrzebski, Lappeenranta (FI); Kimmo Tolsa, Lappenranta (FI)

(73) Assignee: LAPPEENRANNAN TEKNILLINEN YLIOPISTO, Lappeenranta (FI)

(*) Notice: Subject to any disclaimer, the term of this patent is extended or adjusted under 35 U.S.C. 154(b) by 494 days.

(21) Appl. No.: 16/310,172

(22) PCT Filed: Jun. 13, 2017

(86) PCT No.: PCT/FI2017/050437
§ 371 (c)(1),
(2) Date: Dec. 14, 2018

(87) PCT Pub. No.: WO2017/216421
PCT Pub. Date: Dec. 21, 2017

(65) Prior Publication Data
US 2021/0223064 A1    Jul. 22, 2021

(30) Foreign Application Priority Data
Jun. 14, 2016    (FI) .................................... 20165494

(51) Int. Cl.
*G01D 5/20* (2006.01)
*H01F 27/28* (2006.01)
*H01F 27/24* (2006.01)

(52) U.S. Cl.
CPC .......... *G01D 5/2013* (2013.01); *H01F 27/24* (2013.01); *H01F 27/2804* (2013.01)

(58) Field of Classification Search
CPC .... G01D 5/2013; H01F 27/2804; H01F 27/24
See application file for complete search history.

(56) References Cited

U.S. PATENT DOCUMENTS

| | | | | |
|---|---|---|---|---|
| 3,610,029 A | * | 10/1971 | Carlson | G01H 1/10 |
| | | | | 73/649 |
| 3,668,586 A | * | 6/1972 | Horbach | H01F 27/263 |
| | | | | 336/210 |
| 6,504,361 B1 | * | 1/2003 | Gleixner | G01D 5/165 |
| | | | | 324/207.12 |
| 2006/0017431 A1 | | 1/2006 | Glasson | |

(Continued)

FOREIGN PATENT DOCUMENTS

AU    2009295286 A1    4/2010
CN    1708671 A    12/2005

(Continued)

OTHER PUBLICATIONS

International Search Report, dated Jan. 2, 2018, from corresponding PCT/FI2017/050437 application.

(Continued)

*Primary Examiner* — Huy Q Phan
*Assistant Examiner* — Zannatul Ferdous
(74) *Attorney, Agent, or Firm* — Nixon & Vanderhye

(57) ABSTRACT

A position sensor for sensing position or motion, includes: a ferrite core, and a sensor coil configured to provide a sensor signal. The sensor coil is implemented on a printed circuit board, and the ferrite core is configured to be fitted into the printed circuit board.

13 Claims, 12 Drawing Sheets

(56) References Cited

U.S. PATENT DOCUMENTS

| | | | |
|---|---|---|---|
| 2006/0082949 A1* | 4/2006 | Hrubes | G01D 5/202 361/152 |
| 2009/0315493 A1 | 12/2009 | Hsu | |
| 2011/0095658 A1 | 4/2011 | Takeuchi | |
| 2016/0334830 A1* | 11/2016 | Sirohiwala | G05G 5/05 |
| 2017/0227345 A1* | 8/2017 | Sakai | G01B 7/012 |
| 2018/0330878 A1* | 11/2018 | Yamaguchi | B65H 54/2869 |

FOREIGN PATENT DOCUMENTS

| | | |
|---|---|---|
| CN | 1987367 A | 6/2007 |
| CN | 101951041 A | 1/2011 |
| CN | 102798333 A | 11/2012 |
| CN | 103026250 A | 4/2013 |
| DE | 103 55 003 A1 | 6/2005 |
| EP | 2 390 676 A1 | 11/2011 |
| EP | 2 781 888 A2 | 9/2014 |
| FR | 2 800 457 A1 | 5/2001 |
| FR | 2 929 397 A1 | 10/2009 |
| JP | 2009076325 A | 4/2009 |
| WO | 2006067420 A1 | 6/2006 |
| WO | 2010/034082 A1 | 4/2010 |

OTHER PUBLICATIONS

FI Search Report, dated Jan. 18, 2018, from corresponding FI 20165494 application.

Office Action issued in Chinese Patent Application No. 201780036807.2 dated Oct. 28, 2020 with English translation provided.

Notification of the Second Office Action issued in CN Patent Application No. 201780036807.2 dated Aug. 20, 2021, with English translation provided.

* cited by examiner

POSITION SENSOR

TECHNICAL FIELD

The present invention generally relates to position sensors and especially to eddy current and inductive position or proximity sensors.

BACKGROUND ART

This section illustrates useful background information without admission of any technique described herein representative of the state of the art.

Eddy current or inductive sensors are suitable for non-contact measurement of position, proximity, motion, displacement and/or distance. They are suitable for measurements in industrial environments and may be used for example for sensing motion of a rotor or a shaft of an electrical machine. Motion-controlled systems require feedback and therefore position and motion control sensors are required in many systems. For example magnetically levitated systems typically require as many position or motion sensors as there are controlled degrees of freedom.

SUMMARY

In accordance with the invention, there is provided a new sensor arrangement for sensing position of a shaft. The sensor arrangement comprises multiple position sensors and the shaft so that the position sensors are positioned around the shaft, wherein:

each of the position sensors comprises a ferrite core and a sensor coil configured to provide a sensor signal, the sensor coil being implemented on a printed circuit board and the ferrite core being configured to be fitted into the printed circuit board, the shaft comprises one or more grooves and the multiple position sensors are configured to sense position of the grooves to sense position of the shaft, and the multiple position sensors are configured to sense distance between the shaft and the ferrite cores of the multiple position sensors to sense position of the shaft.

The axis of the shaft is in z direction in xyz coordinates and the sensor arrangement comprises:

two or more x direction sensors positioned on different sides of the shaft in x direction, and two or more y direction sensors positioned on different sides of the shaft in y direction.

In an embodiment, the printed circuit board comprises one or more openings and the ferrite core comprises one or more protrusions configured to be fitted into the openings in the printed circuit board.

In an embodiment, the ferrite core is formed of more than one piece of ferrite. The ferrite core may be formed of one or more rectangular ferries, L-shaped ferrites, C-shaped ferrites, E-shaped ferrites, ferrites having a step like form or an arc form or any combination of these when considering cross sections in different directions or planes.

In an embodiment, tracks on the printed circuit board form the sensor coil.

In an embodiment, the sensor is configured to be used for sensing motion of the shaft.

In an embodiment, the shaft is made of ferrite or laminated steel or other equivalent magnetic flux conducting material.

In an embodiment, the multiple sensors are assembled on a common printed circuit board.

In an embodiment, there may be for example two x direction sensors and two y direction sensors positioned on the opposite sides of the shaft. For large shaft diameters and small sensors, more than two pairs of sensors or odd number of sensors can be positioned around the shaft for sensing its position in xyz axis.

In an embodiment, ferrite cores of the x direction sensors are assembled on opposite sides of the printed circuit board of the x direction sensors to provide sensing of axial shift of the shaft in the z direction.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

In the following description, like reference signs denote like elements or steps.

Various embodiments of the invention provide a position sensor. The position sensor may be for example an eddy current sensor or an inductive sensor. The position sensor may be used for sensing position, proximity, motion, displacement, clearance, gap and/or distance in different application environments. Magnetic levitation systems are one example application environment. In an embodiment the position sensor may be used e.g. for sensing position or motion of a shaft or rotor.

In an embodiment the solution works as a part of a levitation system or as a part of an automation monitoring system. E.g. a digital signal provided by a sensor according to an embodiment may be connected to a computer of a standard automation system.

Figure 1:
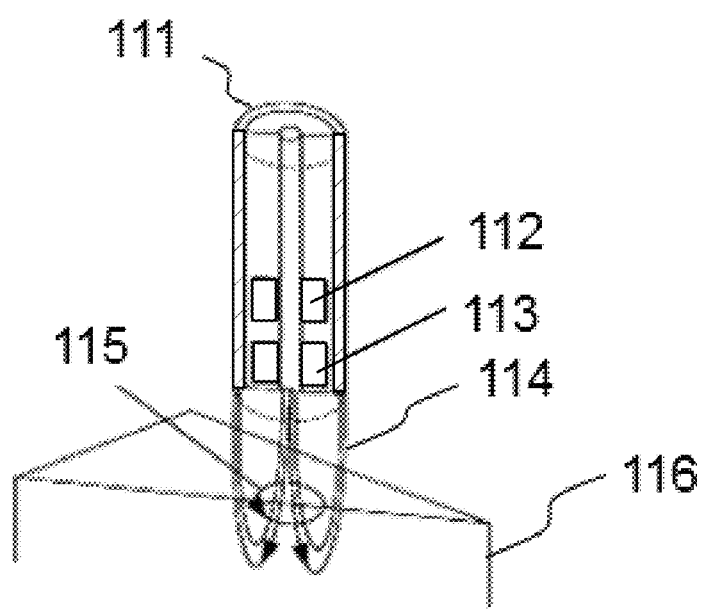
FIG. 1 illustrates the principle of an eddy current sensor.

FIG. 1 illustrates the principle of an eddy current (proximity) sensor. The shown sensor comprises a probe 111. The probe 111 comprises an active coil 113 and a balance coil 112, a driver (not shown) for driving high frequency current in the active coil 113, and electronics (not shown) for demodulating and amplifying the electrical signals from the coils. Further FIG. 1 shows a target conductive material 116. The current in the active coil 113 creates a magnetic field 114 which induces small currents called eddy currents 115 in nearby conductive material 116. The eddy currents generate magnetic field in the opposing direction compared to the magnetic field 114 produced by the coil 113. The energy dissipation, amplitude and phase of currents in the coil 113 varies depending on the distance between the probe 111 and the target conducting material 116. These variations are evaluated electronically and the detected position or motion is provided as an output voltage or current.

Traditional eddy current sensors use sensor tips with wound around coils and separate cables. These make the solution costly, less easily integrated, needing separate calibration for every sensor/cable/driver set and being prone to electromagnetic disturbances.

Various embodiments disclosed herein provide a position sensor (e.g. an eddy current sensor) comprising inductors (coils) printed on a circuit board. In an embodiment the position sensor comprises ferrites and printed circuit board (PCB) layers on which the sensor coils and electronics are implemented. A method of manufacturing such position sensor is provided, too.

A ferrite core is a type of magnetic core used in windings, e.g. transformers and inductors. Typical characteristics of a ferrite core comprise high magnetic permeability and low electrical conductivity.

Various example configurations and example ferrite shapes are discussed in the following. Example ferrite shapes comprise for example rectangular ferrites, L-shape ferrites, C-cores, E-cores and custom shaped cores. In an embodiment the ferrites may have a step like form or an arc form. Any combination of different forms is also possible when considering cross sections in different directions or planes. In an embodiment the position sensor is configured to sense position or motion of a shaft or a rotor or other moving part of an electrical machine. The sensor may sense distance between the sensor and the shaft. Grooves and discs on the shaft may provide means to detect both radial and axial displacements. The sensor may sense position of the grooves or discs to determine the position of the shaft. In an embodiment there are multiple sensors around the shaft. The multiple sensors may accurately provide position feedback without necessarily experiencing runout-induced disturbance in case of rotor. In an embodiment the displacement measurement is implemented by measuring the inductance of the coil or by measuring coupling between active and balance coils, where electromagnetic coupling is through the shaft.

In an embodiment there is provided a position sensor with ferrites as a guiding medium in the sensor, i.e. guiding ferrites are used. The guiding ferrites guide the flux into the rotor or shaft or disc enhancing sensitivity. PCB tracks may be used for coils to ensure manufacturing repeatability, decrease costs and material use associated with windings and to decrease the need for separate calibration of each sensor and cable when discrete components are used. In this way one may achieve improved resolution and also decreased manufacturing costs.

In an embodiment where position of a shaft or other moving part is sensed, sensing in different dimensions (e.g. xyz dimensions) is achieved with certain positioning of ferrite core pieces with respect to the shaft. The shaft is for example made of ferrite or laminated steel or other magnetically conductive material or other material with low permeability for high frequency field.

FIGS. 2-5 show cross sectional views of sensors according to various embodiments of the invention.

Figure 2:
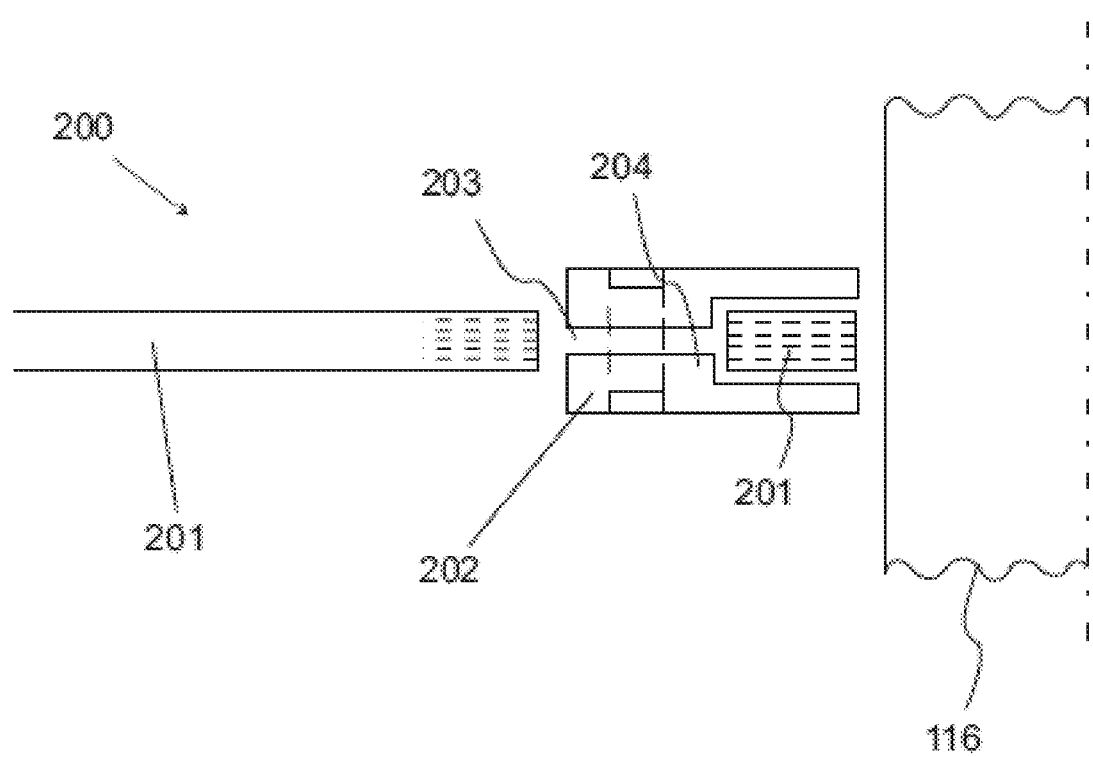
FIGS. 2-5 show cross sectional views of sensors according to various embodiments of the invention.

FIG. 2 shows a sensor 200 and a piece of conducting material (e.g. metal) 116. The sensor 200 is configured to sense position or motion of the piece of conducting material 116 when the conducting material 116 is in proximity of the sensor 200. The sensor 200 comprises a printed circuit board (PCB) 201 and a piece of ferrite 202. Sensor coil (not shown) is implemented in the PCB 201. The PCB 201 comprises an opening 203 and the piece of ferrite 202 comprises a protrusion 204 that extends to the opening 203/can be fitted into the opening 203.

Figure 3:
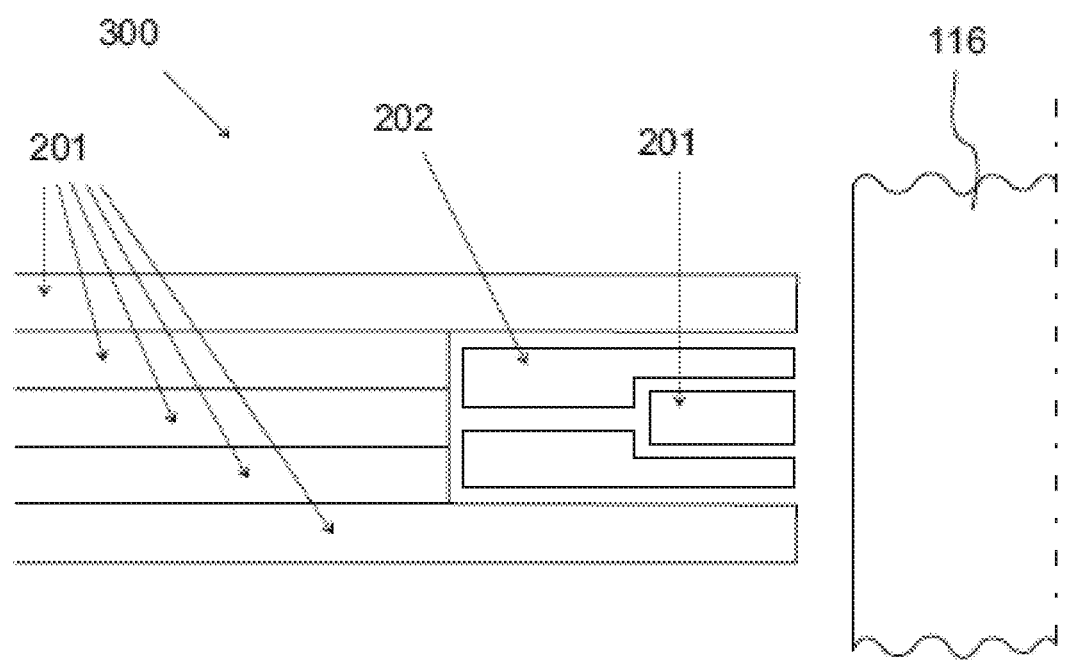

FIG. 3 shows a sensor 300 and a piece of conducting material (e.g. metal) 116. The sensor 300 is similar to the sensor 200 of FIG. 2 except that the PCB of sensor 300 is a multilayer PCB formed of multiple circuit board layers. The multilayer PCB encloses the ferrites and may also enclose PCB components. Similarly to FIG. 2 there is an opening in the PCB and a ferrite protrusion that extends to the opening.

Figure 4:
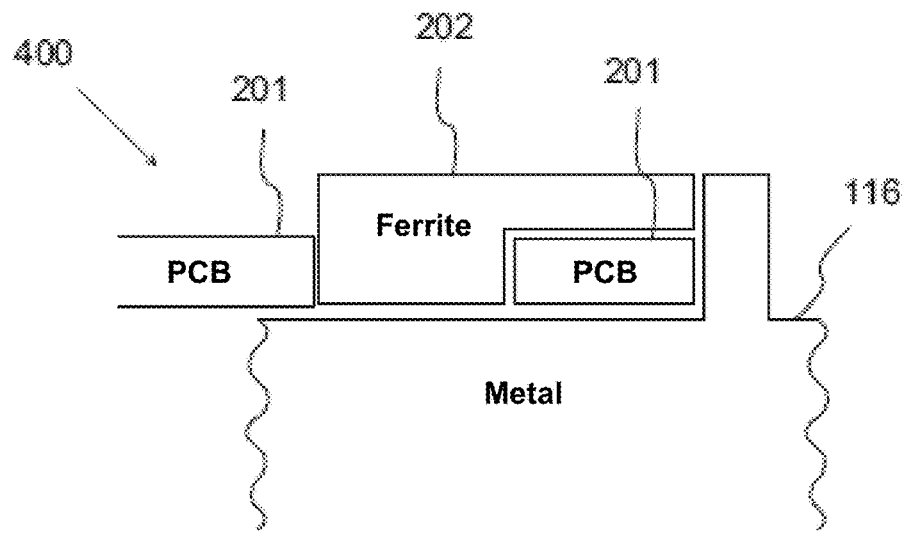

FIG. 4 shows a sensor 400 and a piece of conducting material (e.g. metal) 116. The sensor 400 is similar to the sensor 200 of FIG. 2. Similarly to FIG. 2 there is an opening in the PCB and a ferrite protrusion that extends to the opening.

Figure 5:
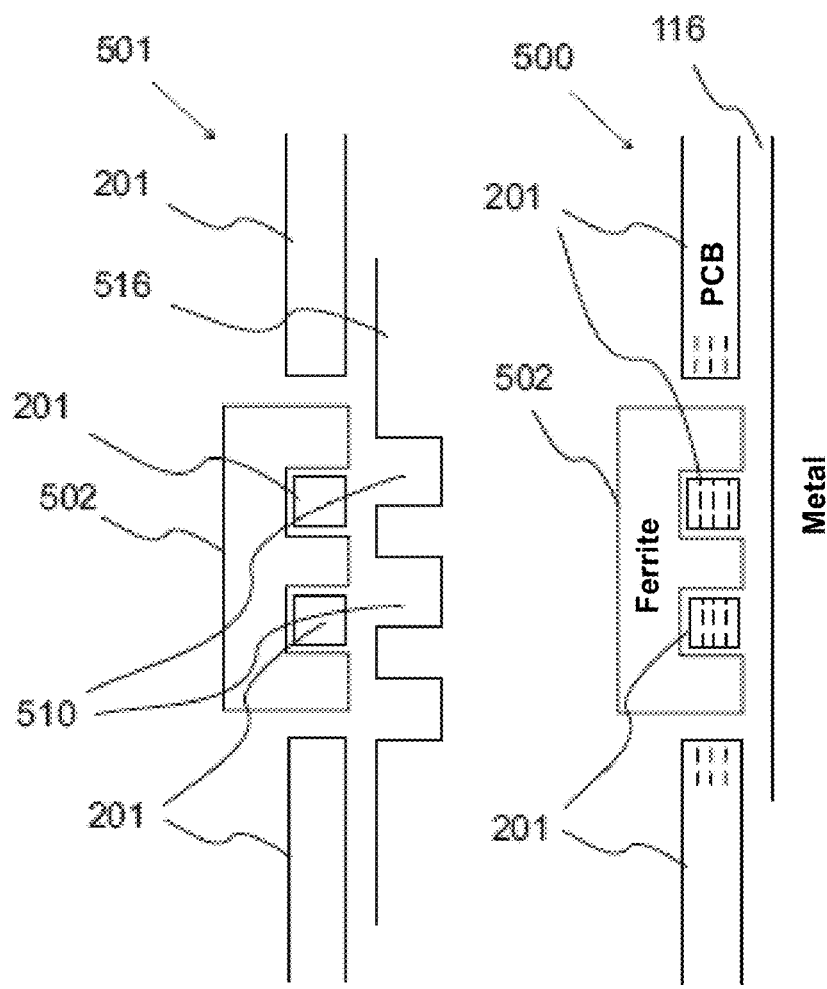

FIG. 5 shows example sensors 500 and 501 with an E-shaped ferrite 502. The sensor 500 is shown in conjunction with a piece of conducting material (e.g. metal) 116. The conducting material may be for example a shaft and the sensor may be used for detection of radial movement of the shaft. The sensor 501 is shown in conjunction with a piece of conducting material (e.g. metal) 516 that comprises grooves 510 on its surface. The grooves allow detecting shaft movement in radial and axial directions. The sensors 500 and 501 are similar to the sensor 200 of FIG. 2 except that there are two openings in the PCB 201 to receive the E-shaped ferrite 502. The sensor 501 is configured to sense the position or motion of the grooves 510 to determine position or motion of the piece 516.

Figure 6:
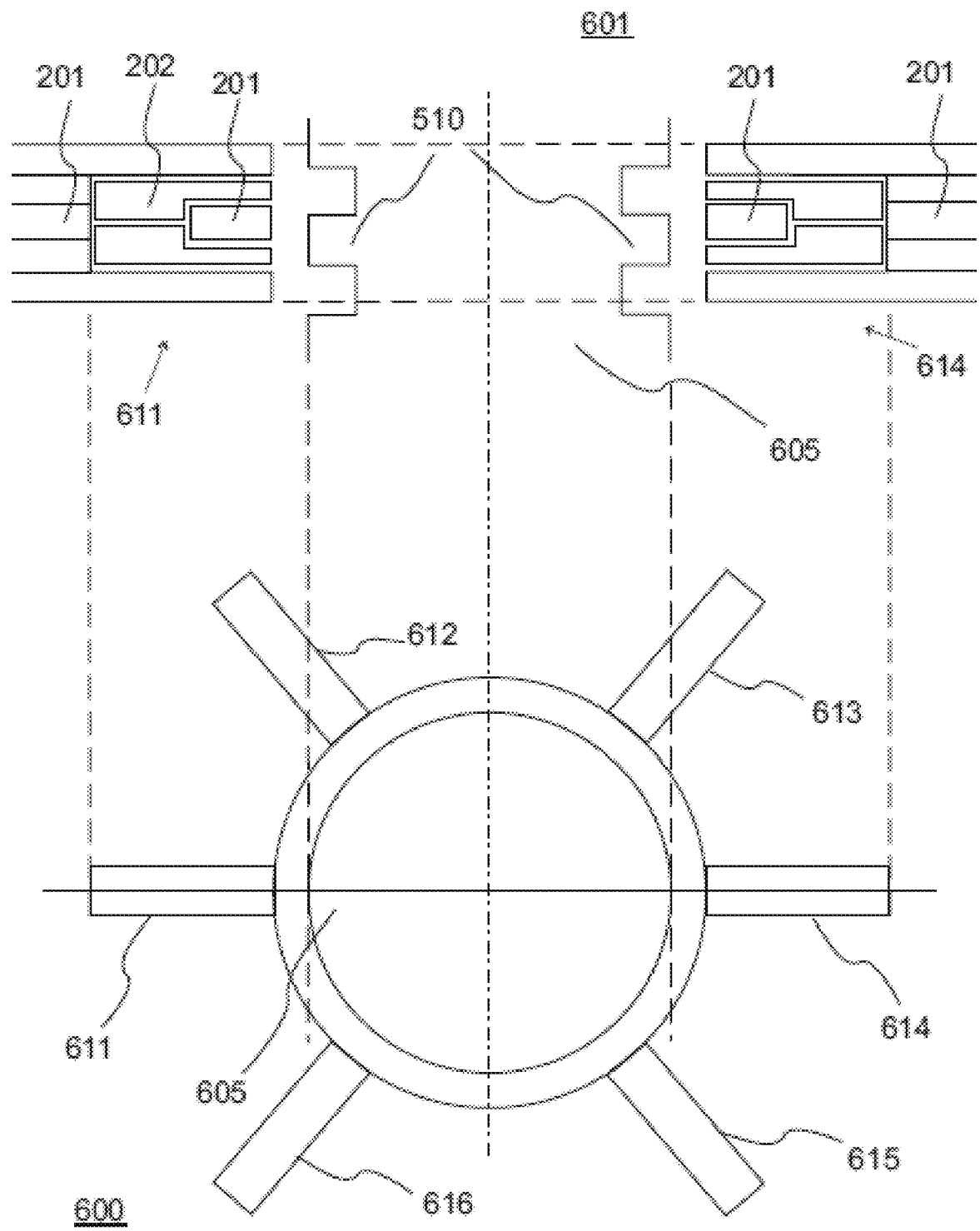
FIG. 6 shows a top view and a cross sectional view of a sensor arrangement according to an embodiment.

FIG. 6 shows a top view 600 and a cross sectional view 601 of a sensor arrangement according to an embodiment. The cross sectional view 601 is taken along line A-A. The sensor arrangement comprises a shaft 605 and multiple sensors 611-616 positioned around the shaft 605. The sensors 611-616 may be implemented on a common printed circuit board that may extend around the shaft, i.e. the PCB may comprise an opening and the shaft may extend through the opening.

The cross sectional view 601 shows the sensors 611 and 614 and the shaft 605. The sensors 611 and 614 are similar to the sensor 200 of FIG. 2 and comprise a PCB 201 and a ferrite core 202 fitted into the PCB 201.

The cross sectional view 601 shows that in this embodiment the shaft comprises grooves 510 on its surface and the sensors 611-616 are configured to sense the position or motion of the grooves 510 to determine position or motion of the shaft 605.

It is to be noted that FIG. 6 shows six sensors, but also other number of sensors may be used. For example four sensors may be used.

FIGS. 7-13 show certain example ferrite shapes that may be used in embodiments of the invention. It is to be noted that only some examples are shown and also other forms of ferrite pieces, cores and shaft grooves may be possible.

Figure 7:
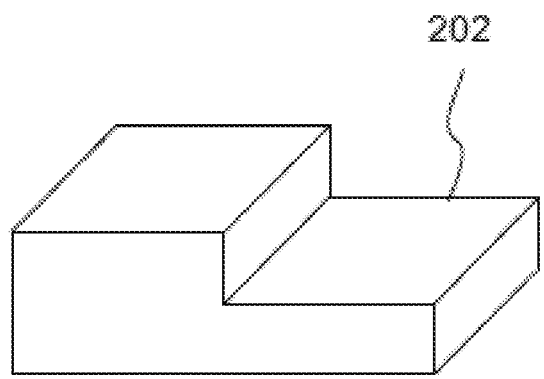
FIGS. 7-13 show certain example ferrite shapes.
Figure 8:
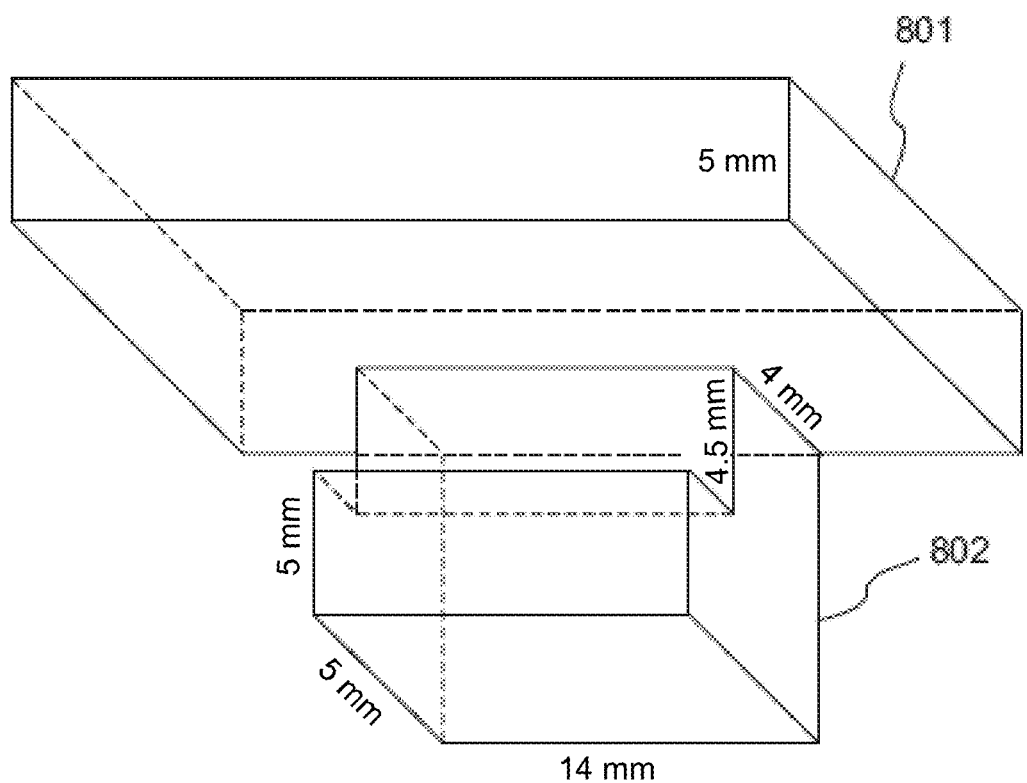

FIG. 7 shows a piece of ferrite 202 with a step like form. FIG. 8 shows a piece of ferrite formed of a rectangular piece 801 and a piece with a step like form 802. FIG. 8 shows example dimension of such piece of ferrite. As an example, the thickness of the rectangular part may be 5 mm.

Figure 9:
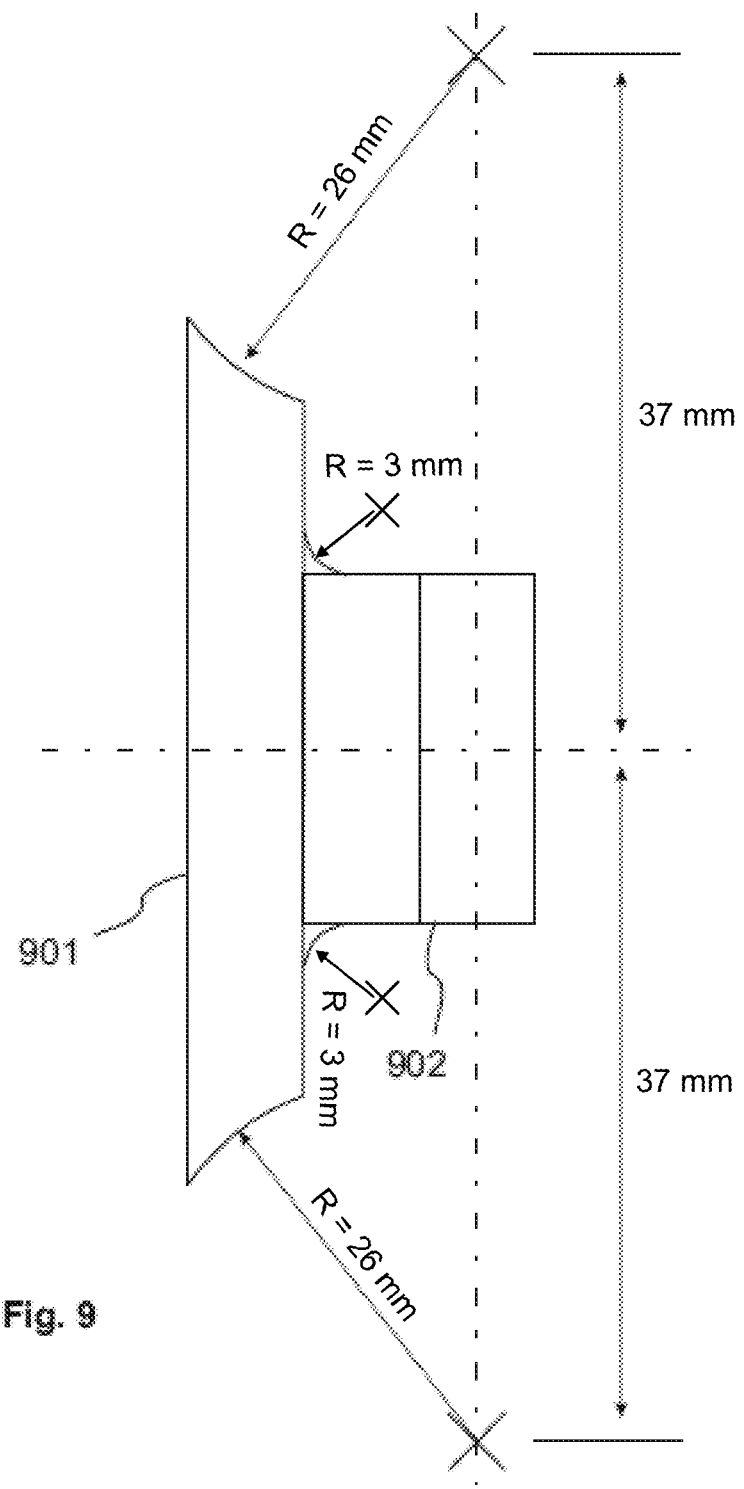

FIG. 9 shows a cross sectional view of an example ferrite comprise of two pieces 901 and 902 with curved finishing on selected edges. FIG. 9 shows example dimension of such piece of ferrite and the curved edges thereof. As an example radius of curving of the edges may be 3 mm.

Figure 10:
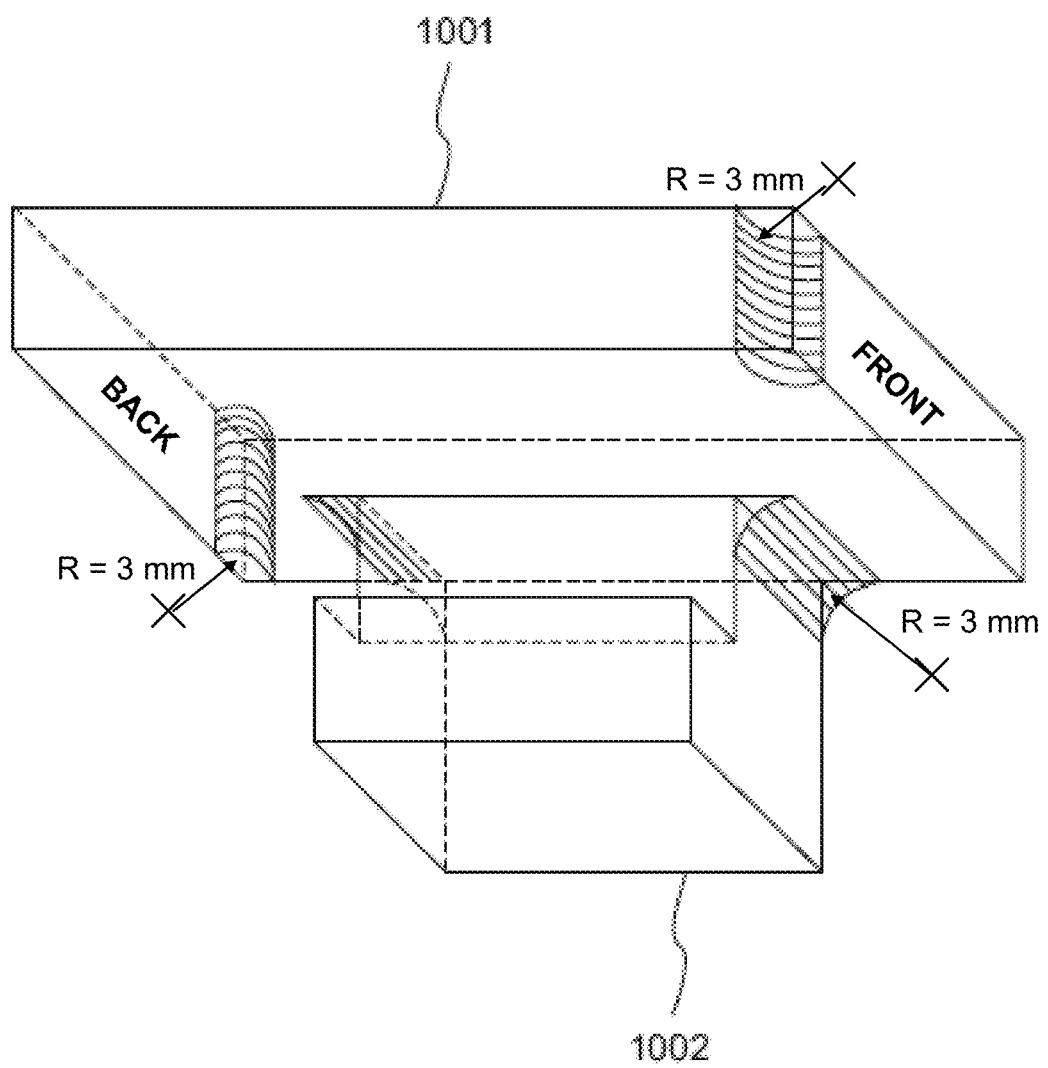
Figure 11:
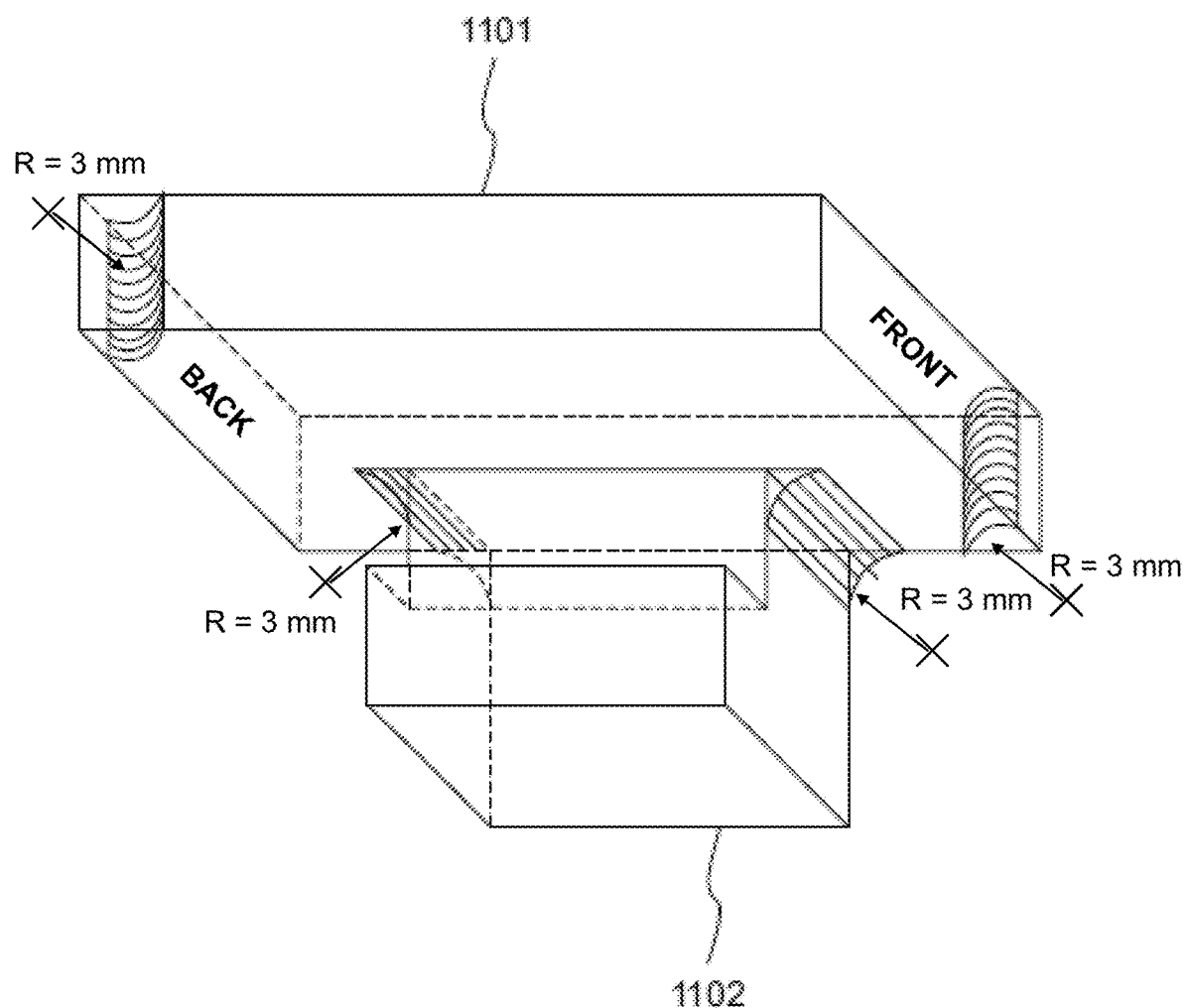

FIGS. 10 and 11 show a piece of ferrite formed of a rectangular piece 1001, 1101 and a piece with a step like form 1002, 1102 with curved finishing on selected edges. FIGS. 10 and 11 show example dimension of such pieces of ferrite and the curved edges thereof. As an example radius of curving of the edges may be 3 mm.

Figure 12:
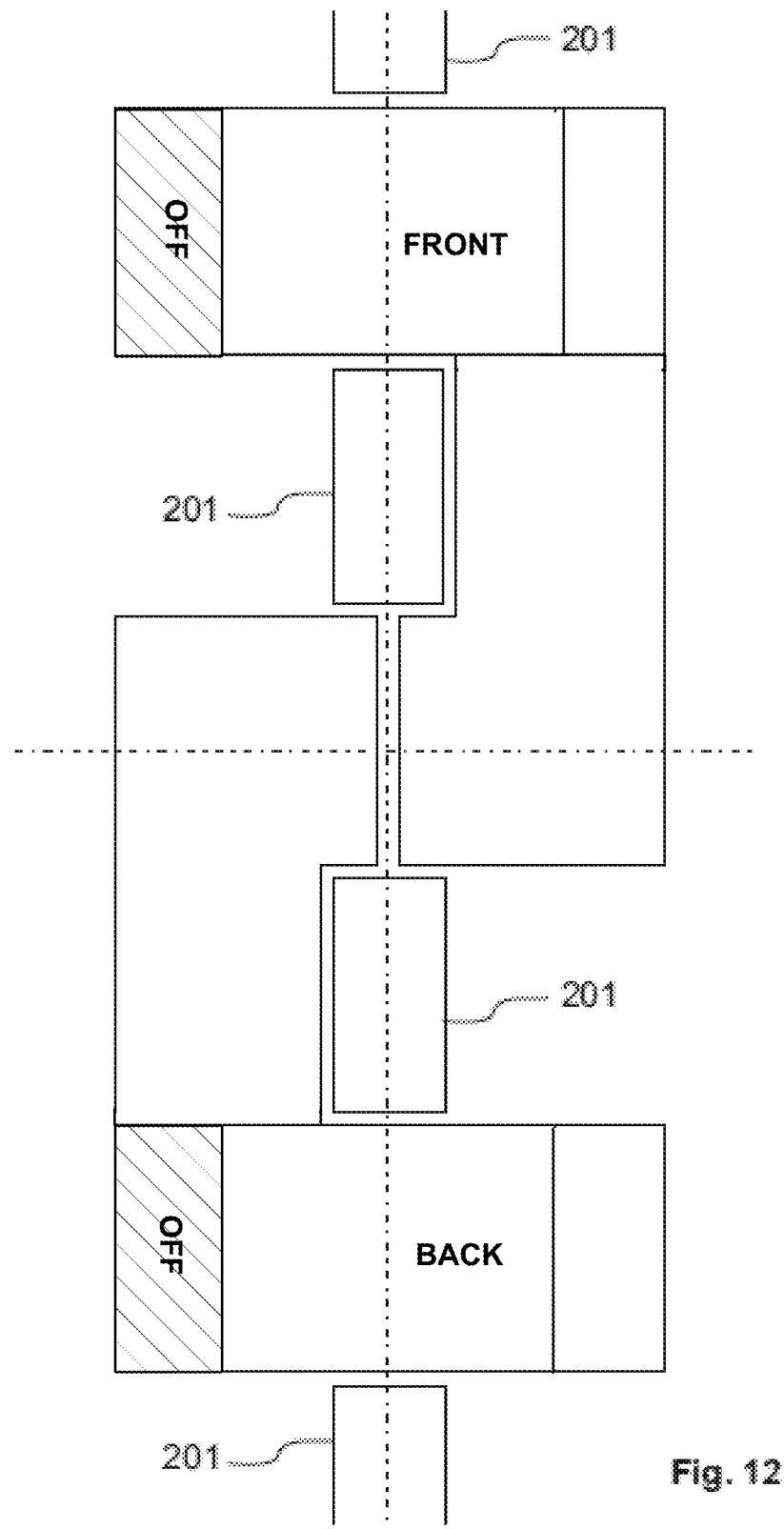
Figure 13:
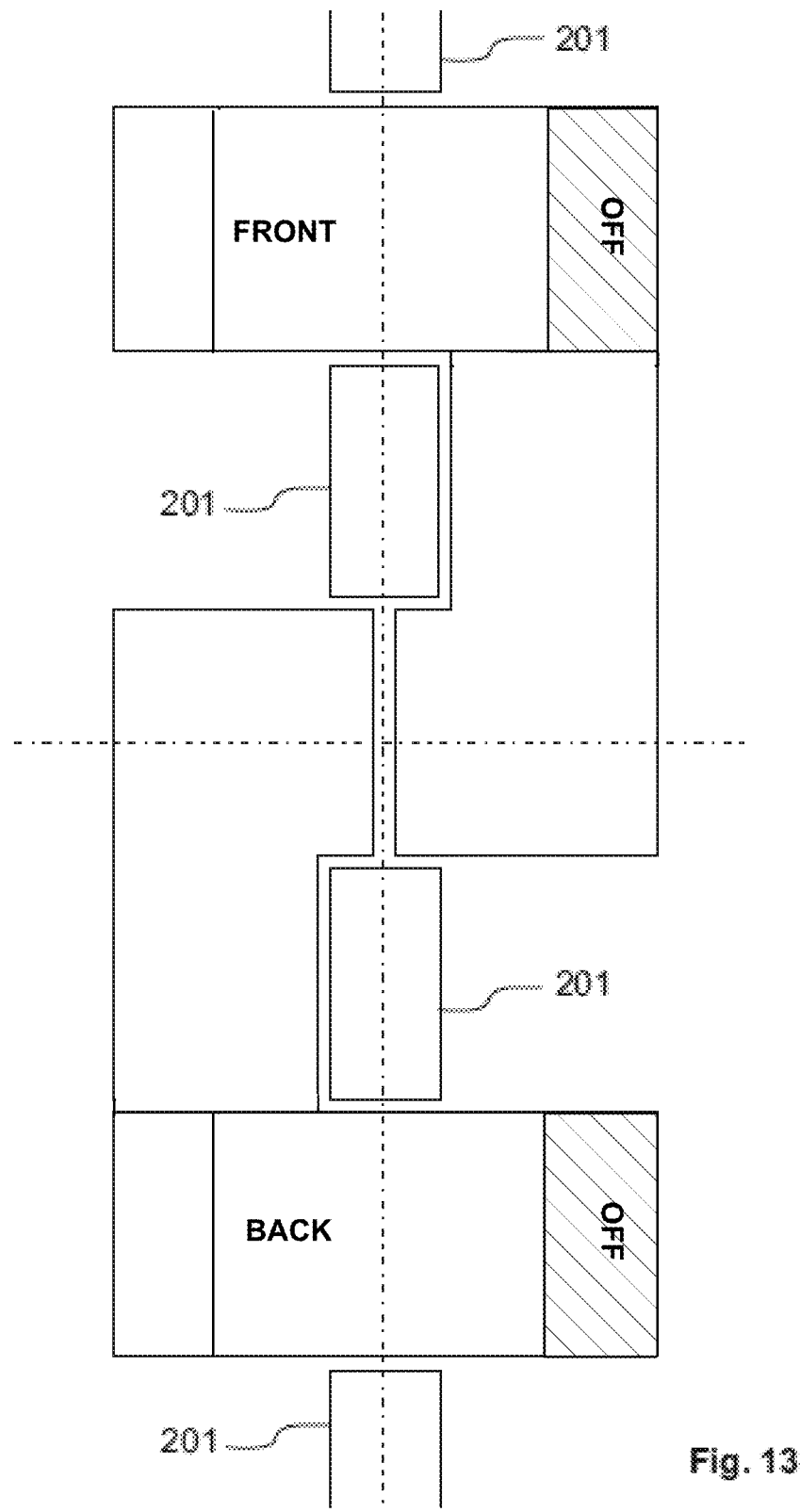

FIGS. 12 and 13 show certain examples of how the ferrites of FIGS. 10 and 11 may be fitted into a PCB 201 to provide xyz sensitivity when detecting position of the shaft with grooves.

Figure 14:
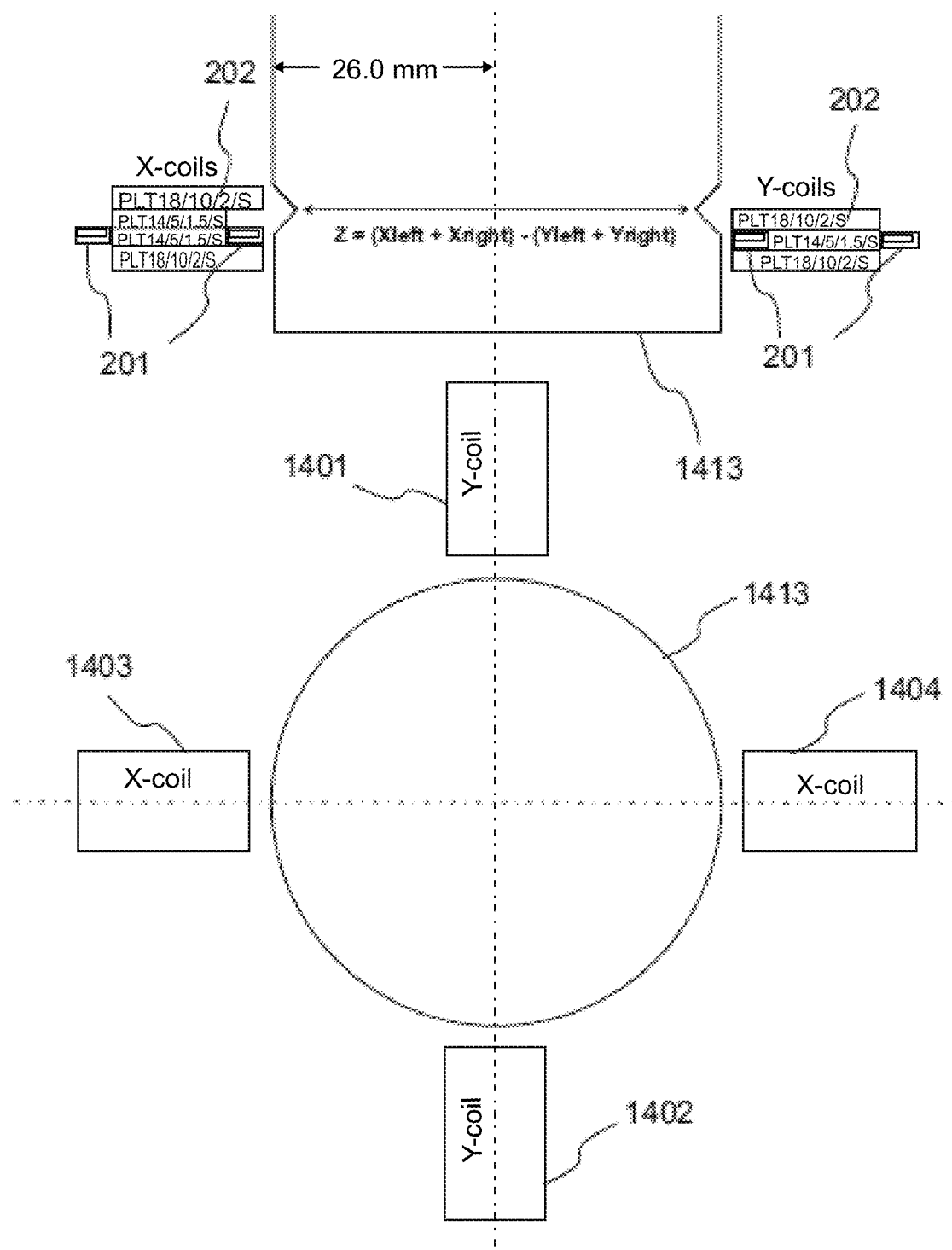
FIG. 14 shows a top view and a cross sectional view of a sensor arrangement according to an embodiment.

FIG. 14 shows a top view and a cross sectional view of an another exemplary sensor arrangement according to an embodiment. The sensor arrangement comprises a shaft 1413 and multiple sensors 1401-1404 positioned around the shaft 1413. The sensors 1401 and 1402 are referred to as y sensors or y coils and the sensors 1403 and 1404 are referred to as x sensors or x coils. The sensors 1401-1404 may be implemented on a common printed circuit board that may extend around the shaft, i.e. the PCB may comprise an opening and the shaft may extend through the opening.

The cross sectional view shows an example ferrite structure for the x coils and y coils. The ferrites are formed of a stack of rectangular ferrites. In the shown example, the x coils are formed of a stack of two PLT18/10/2/S ferrites and two PLT14/5/1.5/S ferrites and the y coils are formed of a stack of two PLT18/10/2/S ferrites and one PLT14/5/1.5/S ferrite.

As an example, displacement or movement in Z direction may be calculated as (Xleft+Xright)−(Yleft+Yright) or when normalized as (Xleft+Xright)−(Yleft+Yright)/(Xleft+Xright+Yleft+Yright), where Xleft corresponds to displacement of rotor/shaft 1413 from the left x coil 1403, Xright corresponds to displacement of rotor/shaft 1413 from the right x coil 1404, Yleft corresponds to displacement of rotor/shaft 1413 from the lefty coil 1402, and Yright corresponds to displacement of rotor/shaft 1413 from the right y coil 1401.

Figure 15:
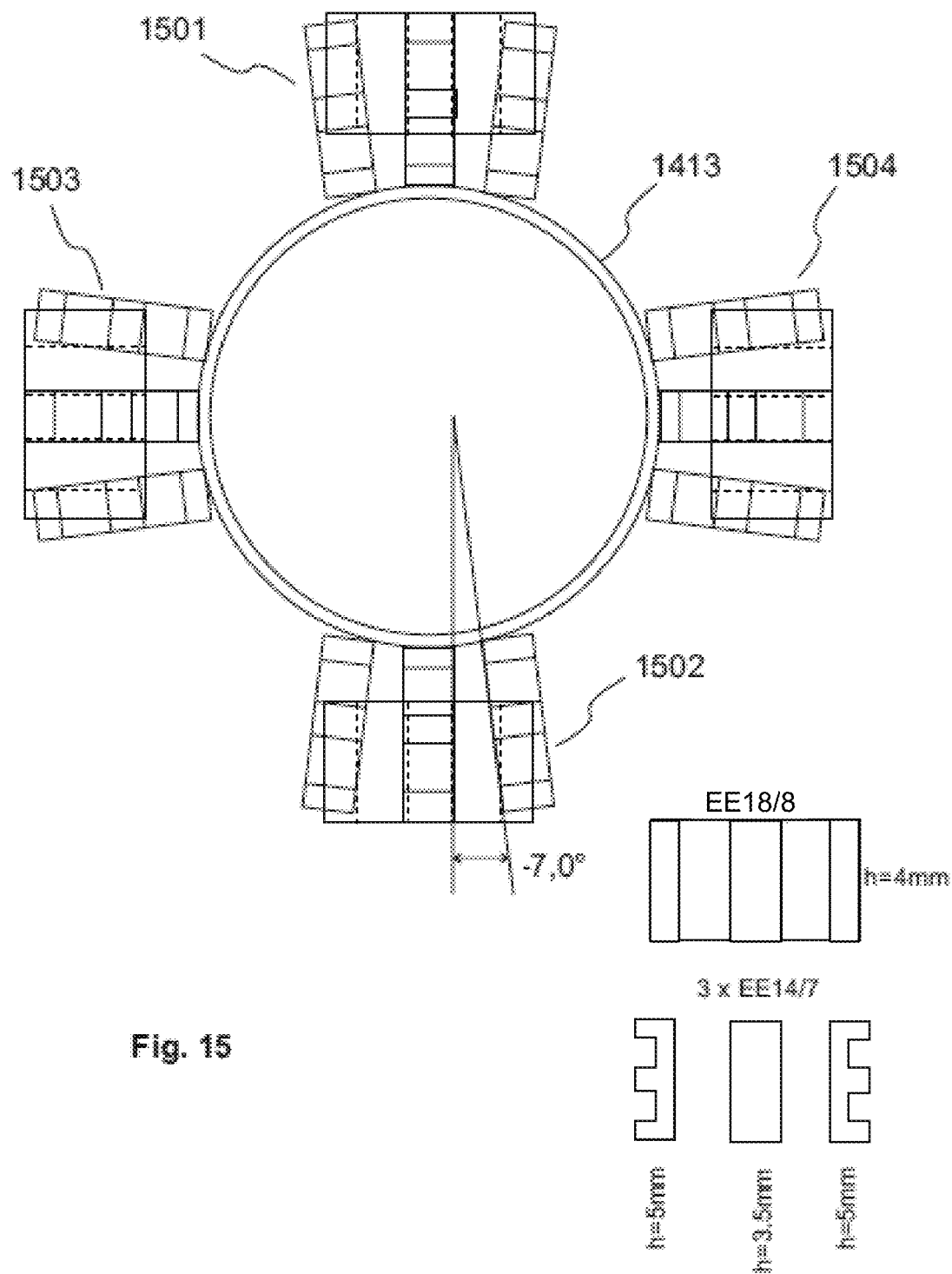
FIG. 15 shows a top view of a sensor arrangement according to an embodiment.

FIG. 15 shows a top view of a sensor arrangement according to an embodiment. The sensor arrangement comprises a shaft 1413 and multiple sensors 1501-1504 positioned around the shaft 1413. The sensors 1501-1504 comprise ferrites formed of one EE18/8 E-shaped ferrite and three EE14/7 E-shaped ferrites. FIG. 15 shows example dimension of the ferrites.

In an example embodiment opposite sensors e.g. in examples of FIGS. 6, 14 and/or 15 may be assembled on opposite sides of the PCB to achieve axial shift for sensing of position or motion in z direction. This may be implemented in x sensor/coils or in y sensors/coils or both.

Various embodiments have been presented. It should be appreciated that in this document, words comprise, include and contain are each used as open-ended expressions with no intended exclusivity.

Without limiting the scope and interpretation of the patent claims, certain technical effects of one or more of the example embodiments disclosed herein are listed in the following: compact and/or inexpensive sensor suitable for sensing many directions. The sensor may be suitable for many applications, e.g. for magnetic levitation systems, monitoring and diagnostics for different applications, for compressors, blowers, motors and generators. Further technical effect is providing an accurate position and/or motion sensor with integrated electronics. Further technical effect is providing a sensor that is capable of working in difficult and/or polluted environment (which is challenging for capacitive sensors) or in proximity of power switches (which is challenging for analog signal transmitting sensors' cables of traditional eddy current sensors). Further technical effect is that production cost of a solution according to some embodiments may involve significant savings compared to currently existing off the shelf solutions. Further technical effect is that the sensor may be easily integrated into an automation system e.g. through Ethernet or a controller can be implemented on the same sensor PCB as the sensor(s). Further technical effect is that the sensor is not sensitive to dust, fluids etc. in the air gap the same way as capacitive sensors typically are. Further technical effect is that there is less need for calibration compared to some other sensors, for example, those that have to be positioned as discrete sensor components around the shaft.

The foregoing description has provided by way of non-limiting examples of particular implementations and embodiments of the invention a full and informative description of the best mode presently contemplated by the inventor for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A sensor arrangement for sensing position of a shaft, the sensor arrangement comprising:
the shaft; and
multiple position sensors positioned around the shaft, wherein,
each of the position sensors comprises a ferrite core and a sensor coil configured to provide a sensor signal, the sensor coil being implemented on a printed circuit board and the ferrite core being configured to be fitted into the printed circuit board,
the shaft comprises one or more grooves and the multiple position sensors are configured to sense position of the grooves to sense position of the shaft, and
the multiple position sensors are configured to sense distance between the shaft and the ferrite cores of the multiple position sensors to sense position of the shaft,
wherein axis of the shaft is in a z direction in xyz coordinates, and the multiple position sensors comprise:
two or more x direction position sensors positioned on different sides of the shaft in x direction, and
two or more y direction position sensors positioned on different sides of the shaft in y direction, the y direction position sensors being structurally different from the x direction position sensors to sense the position of the shaft in the z direction based on a difference between the sensor signals produced by the x direction position sensors and the sensor signals produced by the y direction position sensors.

2. The sensor arrangement of claim 1, wherein the shaft is made of laminated steel.

3. The sensor arrangement of claim 1, wherein the ferrite cores of the x direction position sensors are assembled on opposite sides of the printed circuit board of the x direction position sensors to provide sensing of axial shift of the shaft in the z direction.

4. The sensor arrangement of claim 1, wherein the printed circuit board comprises one or more openings and each ferrite core comprises one or more protrusions configured to be fitted into the openings in the printed circuit board.

5. The sensor arrangement of claim 1, wherein each ferrite core is formed of more than one piece of ferrite.

6. The sensor arrangement of claim 1, wherein tracks on the printed circuit board form the sensor coil.

7. The sensor arrangement of claim 1, wherein each position sensor is configured to be used for sensing motion of the shaft.

8. The sensor arrangement of claim 1, wherein the shaft is made of ferrite steel.

9. The sensor arrangement of claim 1, wherein,
the ferrite cores of the y direction position sensors comprise a first number of ferrites and the ferrite cores of the x direction position sensors comprise a second number of ferrites, the first and second numbers being different.

10. The sensor arrangement of claim 1, wherein,
the ferrite cores of the y direction position sensors comprise a first ferrite arrangement and the ferrite cores of the x direction position sensors comprise a second ferrite arrangement, the first and second ferrite arrangements being different.

11. The sensor arrangement of claim 1, wherein,
the ferrite cores of the y direction position sensors comprise a first number of stacked ferrites and the ferrite cores of the x direction position sensors comprise a second number of stacked ferrites, the first and second numbers being different.

12. The sensor arrangement of claim 1, wherein,
the ferrite cores of the y direction position sensors comprise coils of a first number of ferrites and the ferrite cores of the x direction position sensors comprise coils of a second number of ferrites, the first and second numbers being different.

13. The sensor arrangement of claim 1, wherein,
the ferrite cores of the y direction position sensors comprise coils of a first number of ferrites of a first ferrite material and a second number of ferrites of a second ferrite material, and
the ferrite cores of the x direction position sensors comprise coils of the first number of ferrites of the first ferrite material and a third number of ferrite of the second ferrite material, the second and third numbers being different.

* * * * *